US011477541B2

(12) United States Patent
Montgomery

(10) Patent No.: US 11,477,541 B2
(45) Date of Patent: *Oct. 18, 2022

(54) AUTOMATICALLY GENERATING SUPERCUTS

(71) Applicant: DISH Network L.L.C., Englewood, CO (US)

(72) Inventor: Jesse Montgomery, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/937,371

(22) Filed: Jul. 23, 2020

(65) Prior Publication Data
US 2020/0359111 A1    Nov. 12, 2020

Related U.S. Application Data

(63) Continuation of application No. 16/051,509, filed on Aug. 1, 2018, now Pat. No. 10,764,654.

(51) Int. Cl.
*H04N 21/8405* (2011.01)
*G06F 3/0482* (2013.01)
(Continued)

(52) U.S. Cl.
CPC ....... *H04N 21/8405* (2013.01); *G06F 3/0482* (2013.01); *H04N 21/23* (2013.01);
(Continued)

(58) Field of Classification Search
CPC ........... H04N 21/8405; H04N 21/8458; H04N 21/8583; H04N 21/23; H04N 21/234;
(Continued)

(56) References Cited

U.S. PATENT DOCUMENTS 8,978,075 B1  3/2015  Kaiser et al.
9,467,723 B2  10/2016 Osminer
(Continued)

OTHER PUBLICATIONS

Sawada , "Recast: An Interactive Platform for Personal Media Curation and Distribution", Available Online at: https://www.media.mit.edu/publications/recast-an-interactive-platform-for-personalmedia-curation-and-distribution/, Jun. 2014, 97 pages.

*Primary Examiner* — Joshua D Taylor
(74) *Attorney, Agent, or Firm* — Kilpatrick Townsend & Stockton LLP

(57) ABSTRACT

Embodiments of the present technology may include systems and processes associated with automatically generating supercuts associated with programming content. The present technology may include receiving, at the computing device, a set of related programming content, wherein the set of related programming content includes video clips; receiving an input from a user including a command to generate a supercut and a keyword associated with the supercut; searching the set of related programming content for portions of the video clips associated with the keyword; identifying a first event within a first video clip associated with the keyword and a second event within a second video clip associated with the keyword; determining a type of event associated with each of the first and second events and link the types of events with their respective events; determining a pre-event time period and a post-event time period for each of the first and second events based on the types of events; and generating and displaying a supercut using the first event, the second event, the pre-event time periods, and the post-event time periods. The above steps may be implemented as a computer-implemented method, computer program product, or device such as a television receiver, or in other types of embodiments.

20 Claims, 7 Drawing Sheets

(51) Int. Cl.
*H04N 21/845* (2011.01)
*H04N 21/858* (2011.01)
*H04N 21/234* (2011.01)
*H04N 21/2543* (2011.01)
*H04N 21/254* (2011.01)
*H04N 21/23* (2011.01)
*H04N 21/25* (2011.01)

(52) U.S. Cl.
CPC ..... *H04N 21/234* (2013.01); *H04N 21/23418* (2013.01); *H04N 21/23424* (2013.01); *H04N 21/25* (2013.01); *H04N 21/254* (2013.01); *H04N 21/25435* (2013.01); *H04N 21/8455* (2013.01); *H04N 21/8583* (2013.01)

(58) Field of Classification Search
CPC ....... H04N 21/23418; H04N 21/23424; H04N 21/25; H04N 21/254; H04N 21/25435
See application file for complete search history.

(56) References Cited

U.S. PATENT DOCUMENTS

| | | | |
|---|---|---|---|
| 9,635,337 | B1 | 4/2017 | Dantzler et al. |
| 10,555,023 | B1 | 2/2020 | McCarthy et al. |
| 10,764,654 | B2 | 9/2020 | Montgomery |
| 2003/0099461 | A1 | 5/2003 | Johnson |
| 2003/0221198 | A1 | 11/2003 | Sloo |
| 2008/0282285 | A1 | 11/2008 | Thomas et al. |
| 2009/0061841 | A1 | 3/2009 | Chaudhri et al. |
| 2012/0197966 | A1 | 8/2012 | Wolf et al. |
| 2015/0067721 | A1 | 3/2015 | Cadena Vedova et al. |
| 2015/0296228 | A1 | 10/2015 | Chen et al. |
| 2016/0014482 | A1 | 1/2016 | Chen et al. |
| 2016/0071120 | A1 | 3/2016 | Fleischman et al. |
| 2017/0195753 | A1 | 7/2017 | Dakss et al. |
| 2017/0220869 | A1 | 8/2017 | Blong et al. |
| 2017/0289643 | A1 | 10/2017 | Kachkova et al. |
| 2018/0176634 | A1 | 6/2018 | Jeon et al. |
| 2018/0176661 | A1 | 6/2018 | Varndell et al. |
| 2019/0370558 | A1 | 12/2019 | Forsythe et al. |

AUTOMATICALLY GENERATING SUPERCUTS

CROSS-REFERENCES TO RELATED APPLICATIONS

This application is a continuation of U.S. patent application Ser. No. 16/051,509, filed on Aug. 1, 2018, entitled "Automatically Generating Supercuts," the disclosure of which is hereby incorporated by reference in its entirety for all purposes.

BACKGROUND

Obtaining programming and other content in a variety of different ways is becoming more popular. For example, users may obtain access to content at a device from an over-the-air (OTA) television service provider, such as a satellite or cable television provider, or from an over-the-top (OTT) cloud-based television service provider, and each type of provider includes many different individual providers of content. However, pieces of content may be long and each usually include a variety of different types of subject matter. Therefore, it is difficult for users to obtain a compilation of the exact content they want when spread out over different content providers, different pieces of content, and different platforms. Supercuts may provide compilations of content.

BRIEF SUMMARY

Embodiments of the present technology may include systems and processes associated with automatically generating supercuts associated with programming content. For example, a computing device may include one or more processors, a wireless transceiver communicatively coupled to the one or more processors, and a non-transitory computer readable storage medium communicatively coupled to the one or more processors. The non-transitory computer readable storage medium may include instructions that, when executed by the one or more processors, cause the one or more processors to perform operations including: receiving, at the computing device, a set of related programming content, wherein the set of related programming content includes video clips; receiving an input from a user including a command to generate a supercut and a keyword associated with the supercut; searching the set of related programming content for portions of the video clips associated with the keyword; identifying a first event within a first video clip associated with the keyword and a second event within a second video clip associated with the keyword; determining a type of event associated with each of the first and second events and link the types of events with their respective events; determining a pre-event time period and a post-event time period for each of the first and second events based on the types of events; and generating and displaying a supercut using the first event, the second event, the pre-event time periods, and the post-event time periods. The above steps may be implemented as a computer-implemented method, computer program product, or device such as a television receiver, or in other types of embodiments.

In another aspect, the one or more operations may further include: receiving a second input from a user including a fixed parameter associated with the user's preferences; filtering the set of related programming content using the parameter to generate a reduced set of related programming content; and searching the reduced set of related programming content for portions of the video clips associated with the keyword using the tags. In another aspect, the one or more operations may further include: generating tags associated with each video clip based on content detected in each video clip, and linking the tags to their respective video clips; and searching the set of related programming content for portions of the video clips associated with the keyword using the tags. In another aspect, receiving the set of related programming content may include receiving tags associated with each piece of content in the set of related programming content. In another aspect, the tags may be used when searching the set of related programming content for portions of the video clips associated with the keyword using the tags. In another aspect, generating the supercut may include generating a new file that includes the first video clip and the second video clip. In another aspect, generating the supercut may include displaying the first video clip and the second video clip in succession without generating a new file including the supercut. In another aspect the one or more operations may further include: detecting that the user has paused playback of a piece of programming content; and in response to detecting that the user has paused playback of the piece of programming content, automatically generating the supercut. The above steps may be implemented as a computer-implemented method, computer program product, or device such as a television receiver, or in other types of embodiments.

Embodiments of the present technology may include systems and processes associated with automatically generating supercuts associated with programming content. For example, a computing device may include one or more processors, a wireless transceiver communicatively coupled to the one or more processors, and a non-transitory computer readable storage medium communicatively coupled to the one or more processors. The non-transitory computer readable storage medium may include instructions that, when executed by the one or more processors, cause the one or more processors to perform operations including: receiving, at the computing device, programming content and a type of content associated with the programming content; in response to an input from a user, displaying the programming content on a display device; detecting that the user has paused the programming content; in response to the user pausing the programming content, automatically initiating the generation of a supercut; identifying a portion of the programming content that was displayed on the display device before the user paused the programming content; searching the portion of the programming content for a set of events using the type of content associated with the programming content; identifying one or more video clips from the programming content, wherein each clip includes one or more events from the set of events; and generating a supercut using the one or more video clips, wherein the one or more video clips are displayed one after another in the supercut. The above steps may be implemented as a computer-implemented method, computer program product, or device such as a television receiver, or in other types of embodiments.

In another aspect, the one or more operations may further include displaying a supercut interface on the display device, wherein the supercut interface is overlaid on top of the programming content. In another aspect, the one or more operations may further include receiving a second input from the user at the supercut interface, wherein when the second input is received, the supercut is displayed on the display device instead of the programming content. In another aspect, the one or more operations may further include determining a pre-event time period and a post-event time period for each of the events in the set of events based on the type of content associated with the programming content; applying the pre-event time period and the post-event time period to each of the one or more video clips identified from the programming content; and generating and displaying the supercut using the one or more video clips after the pre-event time period and the post-event time period are applied to the clips. In another aspect, the one or more operations may further include receiving a second input from the user including a keyword associated with the supercut; and searching the portion of the programming content for a set of events using the type of content associated with the programming content and the keyword. In another aspect, the one or more operations may further include generating tags associated with the programming content based on content detected in the programming content, and linking the tags to different portions of the programming content; and searching the portion of the programming content for a set of events using the type of content associated with the programming content and the tags. In another aspect, the one or more operations may further include searching the portion of the programming content for a set of events using the type of content associated with the programming content and a set of tags, wherein receiving programming content includes receiving the tags, wherein the tags are associated with different portions of the programming content. In another aspect, the one or more operations may further include identifying characteristics associated with content of video clips to be included in the supercut based on the type of content; and searching the portion of the programming content for the set of events using the characteristics associated with the content. The above steps may be implemented as a computer-implemented method, computer program product, or device such as a television receiver, or in other types of embodiments.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Figure 1:
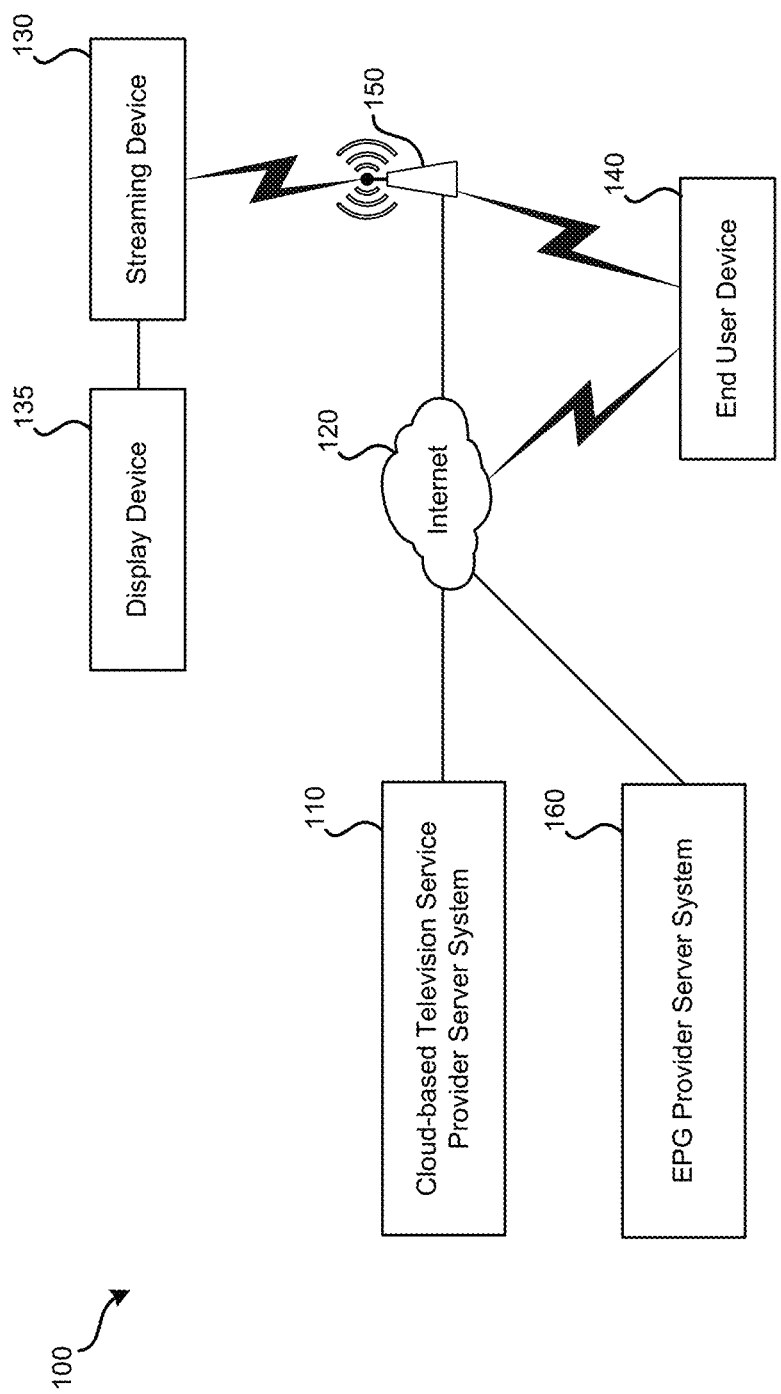
FIG. 1 illustrates an embodiment of a digital video recording system, according to embodiments of the present technology.

Details and additional or alternative features of such embodiments are described in relation to the figures. FIG. 1 illustrates an embodiment of a digital video recording system 100. Digital video recording system 100 ("system 100") may include: cloud-based television service provider server system 110 ("cloud-based server system 110"), Internet 120, streaming device 130, display device 135, end-user device 140, wireless access point 150 ("WAP 150"), and electronic programming guide (EPG) provider server system 160.

Cloud-based television service provider server system 110 may receive streams of television channels (which include television programs) from various content providers. Examples of content providers may be ESPN®, FX®, Comedy Central®, CNN®, BBC®, Lifetime®, Food Network®, TNT®, MSNBC®, etc. Through cloud-based server system 110, a user may obtain individualized access to a subset of such content providers. Such content may be streamed to streaming device 130 and/or end-user device 140 via cloud-based server system 110. Further detail regarding cloud-based server system 110 is provided in relation to FIG. 2. Streams of television channels received by cloud-based server system 110 may be referred to as "scheduled" television channel streams to indicate that the cloud-based server receives programming for the television channels according to a schedule and is therefore required to record the television channel over a particular time period (e.g., in response to a user-defined instruction) if a particular television program streamed is desired to be recorded and stored. For scheduled streaming television programming to be recorded, a user may need to define a record timer that defines a time period and television channel to be recorded from a television channel stream received by the cloud-based server. This distinguishes scheduled streaming content from on-demand content, which is available for streaming at any time and does not need to be recorded based on a user-defined instruction.

Internet 120 may be used for communication between cloud-based server system 110, streaming device 130, and end-user device 140. By virtue of television programming being transmitted to end-user device 140 and/or streaming device 130 via Internet 120, the service provided by cloud-based server system 110 may be referred to as an over the top (OTT) television service since Internet 120 is used for distribution rather than a dedicated television service provider network (such as a cable network or satellite network).

Streaming device 130 may function to access streaming television or other programming from cloud-based server system 110 via Internet 120. Streaming device 130 may receive on demand or scheduled content from television or other content providers. Streaming device 130 may communicate with Internet 120 via WAP 150. WAP 150 may communicate wirelessly using an IEEE 802.11 protocol or some other protocol having high enough bandwidth to transmit live high definition content. In some embodiments, streaming device 130 may communicate via a wire and wired communication protocol with access point 150 or with some other form of device that can be used to connect with the Internet, such as a modem or router. Streaming device 130 may then transmit content, either automatically or after receiving an input from a user, to display device 135 for displaying to the user. Display device 135 may be a monitor, television, or some other display capable of presenting video.

Streaming device 130 may be accompanied by or integrated into a Digital Video Recorder (DVR), such as a bimodal DVR, which may function to access scheduled streaming television programming from cloud-based server system 110 and record over the air (OTA) television programming via one or more antennas. Streaming device 130 may communicate with Internet 120 via WAP 150. WAP 150 may communicate wirelessly using an IEEE 802.11 protocol or some other protocol having high enough bandwidth to transmit live high definition content. In some embodiments, similar to streaming device 130, the DVR may communicate via a wire and wired communication protocol with access point 150 or with some other form of device that can be used to connect with the Internet, such as a modem or router. As such, in some embodiments, wireless access point 150 may not be capable of wireless communication. The DVR may output video and audio signals to a display device 135.

End-user device 140 may represent various forms of computerized devices through which communication with cloud-based server system 110 can be realized. End-user device 140 may be a smartphone, tablet computer, laptop computer, desktop computer, smart television, or some other form of computerized device. End-user device 140 may be used by a user to interact with streaming device 130. A user may stream content facilitated by streaming device 130 to end-user device 140 for viewing or may stream content received by streaming device 130 live. Such streaming may be accomplished directly via WAP 150 or may be performed via Internet 120 (such as if end-user device 140 is not connected to WAP 150 and is located at a remote location). End-user device 140 may also be used to view television programming available from cloud-based server system 110. The user may be required to provide an indication of a user account and login information to permit end-user device 140 to stream content from cloud-based server system 110 and/or streaming device 130. Further detail regarding end-user device 140 is provided in relation to FIG. 3.

Figure 2:
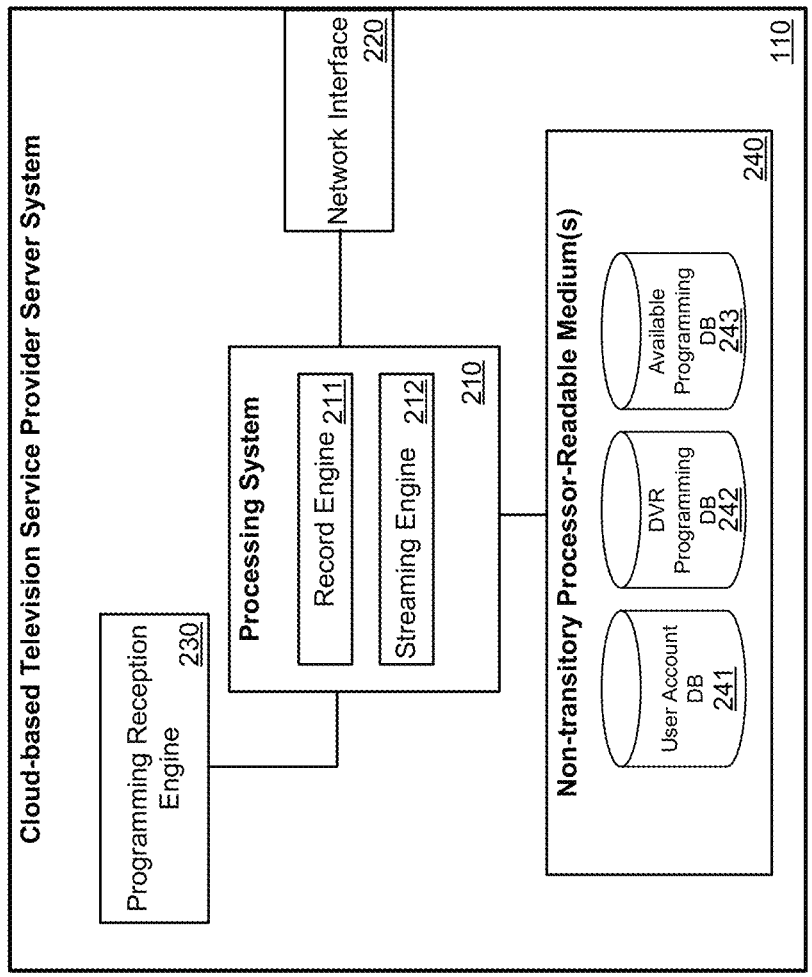
FIG. 2 illustrates an embodiment of a cloud-based television service provider server system, according to embodiments of the present technology.

FIG. 2 illustrates an embodiment 200 of a cloud-based television service provider server system 110. Cloud-based server system 110 may include: processing system 210, network interface 220, programming reception engine 230, and one or more non-transitory processor readable mediums 240.

Processing system 210 may include one or more processors that are configured to perform various functions. Such one or more processors may be general-purpose processors that execute stored processor readable instructions or may be special-purpose processors that are configured to perform particular functions. Processing system 210 may perform bidirectional communication with network interface 220. Processing system 210 may coordinate the recording of programming from programming reception engine 230 to DVR programming database 242. Processing system 210 may read and write data to non-transitory processor readable mediums 240.

Network interface 220 may permit processing system 210 to communicate with one or more end-user devices, one or more DVR devices, and, generally, various computing devices accessible via the Internet. Network interface 220 may use a wired communication. A protocol such as Ethernet may be used.

Programming reception engine 230 may serve to receive streams of television programs from various content providers. Cloud-based server system 110 may manage recordings and live streaming, for example for multiple user accounts that are linked with multiple DVRs.

Processing system 210 may perform various functions, including record engine 211 and streaming engine 212. Record engine 211 may serve to record a television channel stream or other programming stream to DVR programming database 242 in association with a particular user account. If multiple requests to record a particular television program on a television channel have been received from multiple different user accounts, individual instances of the television program may be recorded to DVR programming database 242—one instance in association with each account's request. All television programming that is recorded by cloud-based server system 110 may be stored to DVR programming database 242. Streaming engine 212 may transmit live feeds of television channels from programming reception engine 232 and an end-user device or a DVR via network interface 220. Streaming engine 212 may also transmit streams of recorded television programs from DVR programming database 242 to an end-user device or DVR that is linked with the user account with which the recording is associated.

User account database 241 may store information on the various user accounts of cloud-based server system 110. User account database 241 may indicate the particular end-user device and DVR that are permitted to access a particular user account. Recordings of television programs made to DVR programming database 242 may each be linked to a particular user account indicated in user account database 241. As previously indicated, many copies of the same recording may be present within DVR programming database 242, but may each be linked with a different user account in user account database 241.

Available programming database 243 may store indications of the particular television channels that are available in association with a given user account (and/or linked DVR). Available programming database 243, for a given user account, may indicate streaming television channels available via programming reception engine 230 that are permissible to access in accordance with the user account and may indicate the television channels that are received with a sufficient signal strength associated with the user account to be eligible to be recorded.

Figure 3:
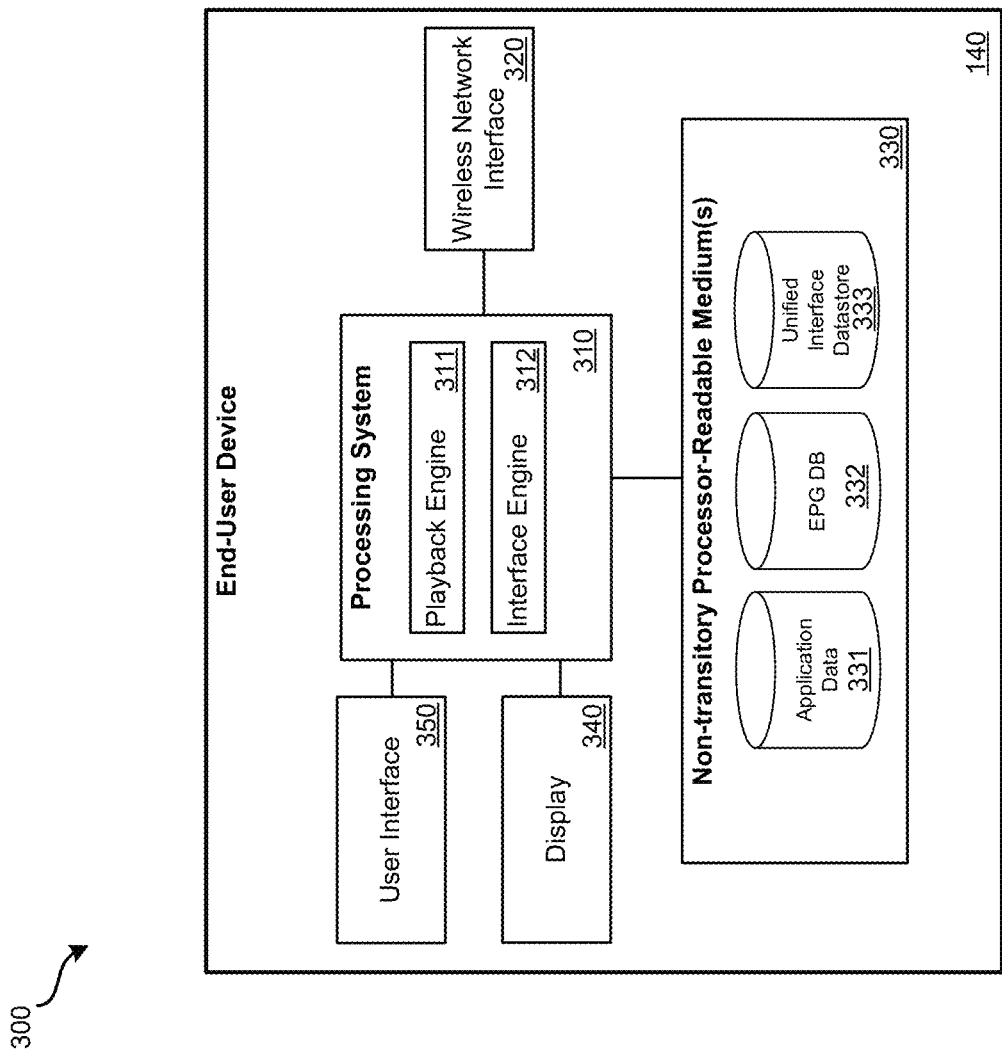
FIG. 3 illustrates an embodiment of an end-user device, according to embodiments of the present technology.

FIG. 3 illustrates an embodiment 300 of an end-user device 140. End-user device 140 may be used for presenting OTA television programming from a DVR linked with the same account as the end-user device 140, for streaming television programming from a cloud-based server, and/or for setting record timers at the cloud-based server system and/or DVR. End-user device 140 may include: processing system 310, wireless network interface 320, one or more non-transitory processor readable mediums 330, display 340, and user interface 350. A streaming device, such as streaming device 130, may also be integrated into end-user device 140.

Processing system 310 may include one or more processors that are configured to perform various functions. Such one or more processors may be general-purpose processors that execute stored processor readable instructions or may be special-purpose processors that are configured to perform particular functions. Processing system 310 may perform bidirectional communication with wireless network interface 320. Processing system 310 may read and write data to one or more non-transitory processor readable mediums 330. Processing system 310 may output programming and interfaces for display to display 340; processing system 310 may receive input from user interface 350.

Wireless network interface 320 may permit processing system 310 to communicate with cloud-based server system 110, streaming device 130 and, generally, various services available via the Internet. Wireless network interface 320 may communicate using an IEEE 802.11 protocol or some other wireless protocol that has sufficient bandwidth to transmit video and audio data. In some embodiments, additionally or alternatively, a wired network interface may be present. Such a wired network interface may be connected, via a wire, to an Internet access point. For such wired communication, a protocol such as Ethernet may be used. End-user device 140 may use a cellular network (e.g., LTE, 3G, 4G, etc.) to connect with the Internet.

One or more non-transitory processor readable mediums 330 may store various databases or other various data storage arrangements to store data related to end-user device 140. Application data 331 may store data related to particular applications that may be executed by end-user device 140. For example, a specialized application may be downloaded and installed on one or more non-transitory processor readable mediums 330 for use in accessing the cloud-based server system and a DVR linked with the same account as the end-user device. EPG database 332 may store programming information about when television programming is scheduled to be broadcast (OTA and streaming) on various television channels accessible as streaming through the cloud-based server system and via the DVR linked with the same user account. The television channels may include television channels that can be successfully received via an antenna port of the DVR and streaming television channels that the user has access to via the cloud-based server. Data for EPG database 332 may be obtained from a dedicated EPG server, such as EPG provider server system 160 of FIG. 1. In other embodiments, EPG data may be routed through cloud-based television service provider server system 110.

Unified interface data store 333 may represent storage of one or more interfaces that are output for presentation via display 340 (and, possibly, a speaker) and allow a user to interact with OTA programming and cloud stored programming. Unified interface data store 333 may function as detailed in relation to unified interface data store 244.

User interface 350 may be a keyboard, pointing device, microphone, or some other form of input device that allows a user to provide input to end-user device 140. In some embodiments, user interface 350 may be a touchscreen that is incorporated as part of display 340. Therefore, display 340 and user interface 350 may represent components of a single touchscreen.

Processing system 310 may perform various functions, including playback engine 311 and interface engine 312. Playback engine 311 may allow processing system 310 to playback OTA television programming received from a DVR and playback streaming television program received from the cloud-based server. Television programming from the cloud-based server system may be either live or stored in the cloud-based DVR database and linked with the same user account as end-user device 140. Interface engine 312 may use one or more interfaces from unified interface data store 333 to present an interface, via display 340, to allow a user to interact with both cloud-based stored streaming television programming and OTA television programming stored by a DVR linked with the same user account as the end-user device 140. Therefore, the same or similar unified interfaces that are output for presentation by DVR may be output for presentation by end-user device 140.

A user may obtain access to programming content in a variety of different ways. For example, a user may obtain access to programming content at a device from an OTA television service provider (such as a satellite or cable television provider) or from an OTT cloud-based television service provider. A user may also obtain access to content, television programming or otherwise, from local storage on a DVR, an end user device, such as end user device 140, or streaming device, such as streaming device 130, among others. For example, a user may capture video content using a photo or video capture device integrated into a mobile phone, or using other means. In another example, a user may obtain access to content using an Internet streaming website, such as YouTube. Since a user may want to view content related to a specific topic or keyword, a user may search for that keyword on one or more of these content platforms. However, generally programming content or video content are provided to a user in full, and are not broken down into shorter, more discrete and targeted clips of content that are more specific to a certain topic. In some embodiments of the present technology, a user may initiate or the system may automatically generate a supercut of relevant content based on a variety of different factors.

Figure 4:
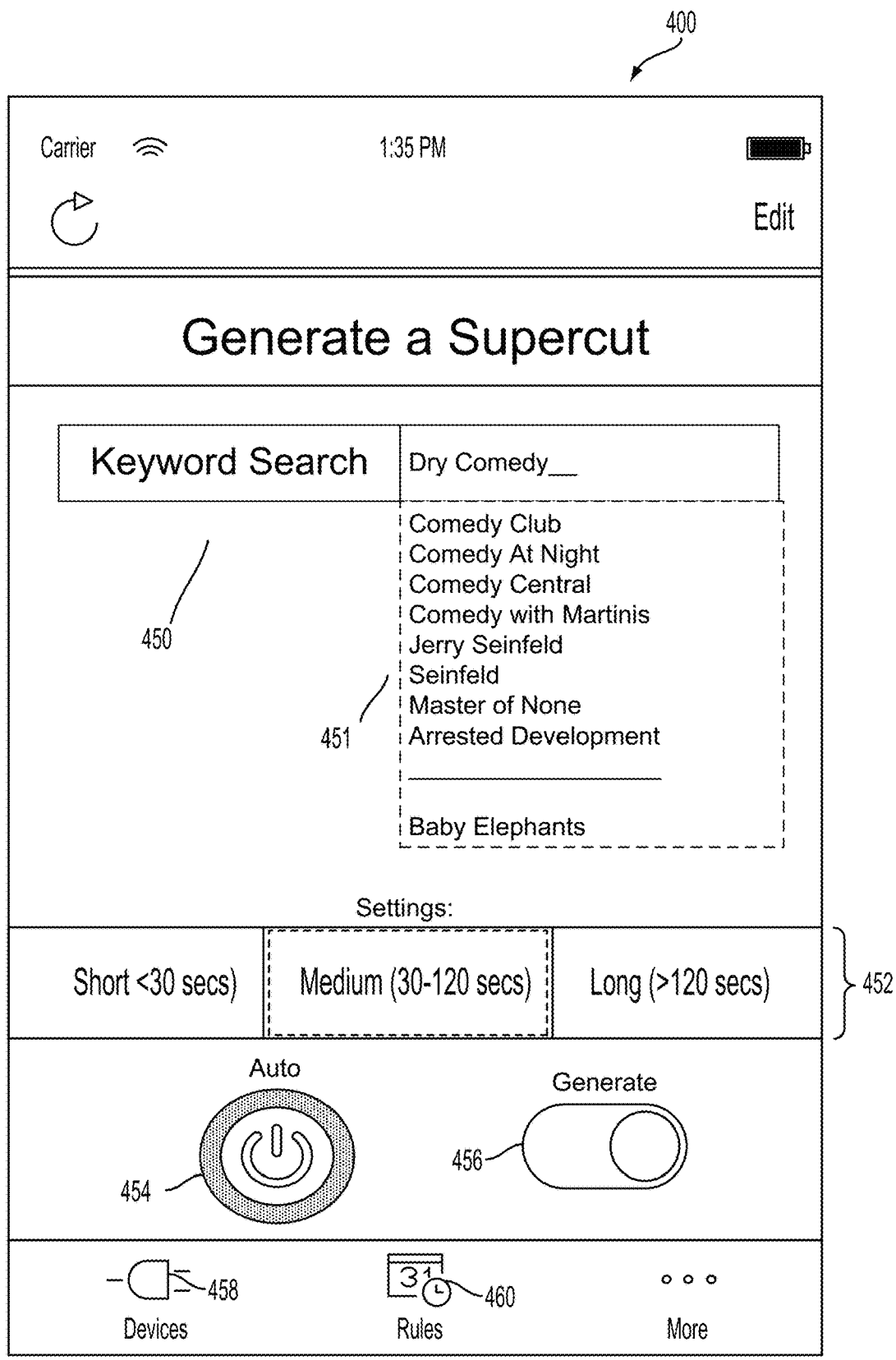
FIG. 4 illustrates an example interface 400 for controlling a mobile device and a supercut generation system, according to embodiments of the present technology.

FIG. 4 illustrates an example interface 400 for controlling a mobile device and a supercut generation system, according to embodiments of the present technology. Interface 400 may allow a user to initiate the generation of a supercut by the supercut generation system. A supercut generated by the system may include clips of content analyzed and selected based on a variety of variables. For example, the content may be based on a user's input, such as a keyword. The content may also be chosen based on a chosen (either automatically or by a user) scope of search based on groups of content or databases associated with the content.

Interface 400 includes a keyword search interface 450, which may allow a user to input alphanumeric characters to indicate an interest in a certain type of content in order to generate a supercut with clips of video content directed to that interest. The search interface 450 or other similar interface may also be presented to a user only after the user indicates that the user would like to view a supercut. In some embodiments, after the user has indicated that the user would like to view a supercut, the supercut generation system may output or display the keyword search interface 450, which may be configured to allow the user to input additional information associated with the requested supercut. The user may then input the alphanumeric characters "Dry Comedy" into the keyword search interface 450 in order to generate a supercut related to dry comedy. The keyword search function on interface 400 may also display dynamic search results 451 associated with the keyword search inputted by the user. For example, proposed search results may be displayed near the search query after the user enters an alphanumeric character, and may dynamically change as the user inputs additional characters. The search results 451 may be determined by the system to be the most likely results associated with the input from the user based on the input at any given time. For example, example search results for the input of "dry comedy" may include content including "comedy club", "comedy at night", etc.

User inputs may come in a variety of forms. In some embodiments, the user may enter an input using a user interface associated with a user device. In some embodiments, the user may speak to the device, and the device may recognize the user's voice using voice recognition software, among others.

In order to provide a user with search results, and ultimately a supercut including clips of content in response to a user input, the supercut generation system may receive or retrieve content from multiple sources. As noted herein, the supercut generation system may receive content from an OTA television service provider (such as a satellite or cable television service provider), from an OTT cloud-based television service provider, from local storage on a DVR, from local storage on a mobile or other device, from an Internet streaming provider, among others. To search for, select, and provide relevant content to the user in response to an input, the various content may be characterized by the supercut generation system. For example, the supercut generation system may analyze and tag each piece of content with metadata associated with the substance of the content. Pieces of content may be associated with metadata from a variety of different sources. In some embodiments, the supercut generation system may analyze a piece of content and assign tags to it based on the substance of the content. In some embodiments, the system may assign tags using audio, facial (e.g., for tags associated with an actor or character), character, or other types of recognition software. Recognition software may be used to determine when a specific type of event takes place within a piece of content so as to determine which tags should be assigned to that content. For example, audio recognition may be used to determine when a joke is present in a piece of content. The system may identify a joke by determining when an actor or a studio audience laughs. The system may also identify the beginning and/or end of an event, such as a joke, using these types of recognition. For example, the beginning of a joke may be identified by tracking the beginning of a statement that took place previous to the beginning of the identified laughter. In some embodiments, the content may be received from a content provider with tags already assigned to it. In some embodiments, content may include metadata associated with closed captioning assigned to the content. In some embodiments, optical correlators may be used to analyze images from the content and identify tags to be assigned to content. For example, optical correlators, audio correlators, closed captioning correlators, among others may be used. In some embodiments, machine learning may be used to track content and associated metadata over time and to automatically identify tags to be assigned to newly received content. In some embodiments, tags may be entered manually by a user or other person by watching the content and manually assigning tags to the content based on the person's judgment.

Tagging of content may be performed at different times during the processes described herein. For example, in some embodiments, content may already be tagged when received by the supercut generation system or the user's device. In some embodiments, the user may tag programming using a remote control, interactive display, user interface, audio recognition via Alexa or other recognition hardware/software, etc. In other embodiments, a programming content provider may tag programming content before being displayed or transmitted to an end user device, streaming device, cloud-based television service provider, among others.

Figure 5:
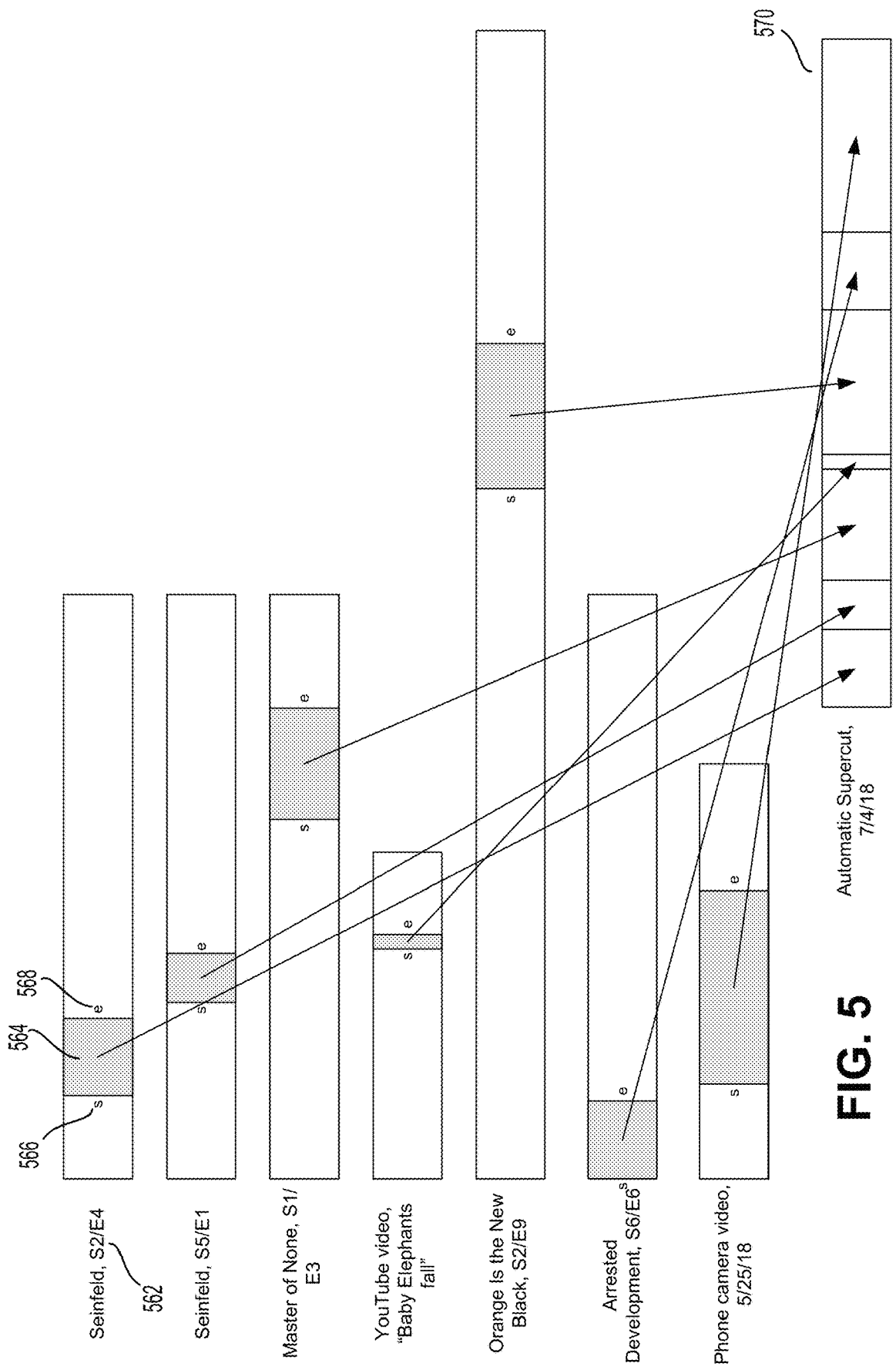
FIG. 5 illustrates a diagram showing generation of an example supercut 570, according to embodiments of the present technology.

FIG. 5 illustrates a diagram showing generation of an example supercut 570, according to embodiments of the present technology. The supercut generation system may identify one or more clips of programming or other content that, based on the client's keyword(s) and/or preferences and the content of each clip, may be included in the supercut. For example, if a user provided an input to the supercut generation system that the user would like to view a supercut related to dry comedy, the supercut generation system may analyze content to determine portions of that content (later captured in clips of content) that are related to dry comedy. The supercut generation system may filter the content it has access to based on the user's input(s) and/or parameters (e.g., either inputted by the user along with the keyword or automatically and dynamically determined over time by the supercut generation system). Then, the supercut generation system may analyze each piece of content from the filtered set to determine which clips are most relevant to the user's supercut. In some embodiments, the supercut generation system may not filer the set of content and search through and analyze the entire set of content it has access to.

The user or the supercut generation system may set additional parameters for the search for relevant content for the supercut. For example, the user may only want the supercut to include certain types of clips of content. More specifically, for example, the user may only want the supercut to include content from a certain genre of television show, from a certain show or movie, or from a certain season of a television show. The user may specify any number or type of parameters to narrow the group of content that the supercut generation system searches through to find content for the supercut. In some embodiments, the supercut generation system may dynamically analyze its content over time to determine which of these parameters the user inputs most often, or to determine and implement certain information as parameters based on the user's actions or inputs. For example, if a user watches a specific season of a specific television show more than any other, the supercut generation system may determine that season of that show should be included in all or most of the user's supercuts, or at least in the content that the supercut generation system searches through when generating a supercut.

After the supercut generation system has identified content that it deems relevant to the user's requested supercut, the supercut generation system may select one or more pieces of content to be included in supercut 570. For example, the supercut generation system may determine that one or more episodes of Seinfeld should be included in the dry comedy supercut based on the user's input(s) and/or the analysis of content and the user by the supercut generation system over time. As noted herein, the supercut generation system may determine a start time 566 and an end time 568 of a clip 564 within the Seinfeld episode. Then, the supercut generation system may insert the clip 564 into supercut 570, as shown in FIG. 5.

The supercut generation system may also determine an order of the clips it identifies for supercut 570. For example, the supercut generation system may determine the order based on user preferences, the length of each clip (the order by length may itself be based on user preferences), the content of each clip, the age of each clip, among other factors. The determination of order may be based upon a holistic or artistic analysis of the clips so that the flow of the clips, based on the analysis of the user or the supercut generation system, makes sense from those perspectives.

In some embodiments, settings may be determined (either using a user input or determined automatically using machine learning) to assist the system in determining the beginning and/or end of a clip and tags to be associated with that clip. For example, the settings may identify rules that apply to certain types of clips, or clips with certain types of substance, either based on metadata or otherwise. For example, if a clip includes a joke, it may be difficult for the system to identify when the joke began since some jokes include several interactions between multiple people, and other jokes only include on self-sustaining sentence form one person. Therefore, machine learning may be used to identify a length of a piece of content from before the joke that should be included in a clip in order to capture the entire joke or interaction. This may be determined based on analyzing many jokes over time to determine what length of time would capture all or most (e.g., based on a certain percentage) jokes in full. The settings may be solely determined using user inputs and/or machine learning by the supercut generation system, or the settings and parameters may include defaults set by the user or by machine learning such that the defaults are only overridden under certain circumstances or when certain conditions are met. The conditions may also be set by a user or by the supercut generation system using machine learning or other methods. The defaults may include the most popular or regularly used settings (e.g., by demographics, region, settings specific to the user or the average of the users in a household, etc.). The defaults, or other settings, may change over time, either automatically (e.g., dynamically) or manually.

The system may also receive additional inputs from the user, including a requested length of the supercut selected at length setting 452. For example, the user may select that the supercut be short (e.g., less than 30 seconds long), of medium length (e.g., between 30 and 120 seconds long), or long (e.g., longer than 120 seconds long). In some embodiments, the length of a supercut may be determined based upon user preferences or rules set by the user.

In some embodiments, the length of the supercut may be automatically determined by the supercut generation system. For example, the supercut generation system may determine a length for a supercut based on machine learning. The supercut generation system may collect and analyze data associated with the user and the user's preferences over time in order to determine the length (or other characteristics) for a supercut. For example, a user may prefer short supercuts, or may prefer short supercuts when directed to a certain type of content, among other characteristics. The supercut generation system may then use this analysis to generate a rule that the default length of supercuts for the user is short. The supercut generation system may then analyze characteristics of a particular requested supercut to determine if the supercut should have a length different from the default length.

The supercut generation system may also determine a length for a supercut using a variety of other processes. For example, in some embodiments, the length of a supercut may be based upon a number of clips of content that the supercut generation system identified as being relevant to the user's keyword so as to include them in the supercut. In some embodiments, the length may be determined by the length of each individual clip, which may each be extended or reduced based on the type of clip, the content in the clip, and the determined length of the supercut. For example, if the clip includes a goal from a hockey game, the clip may automatically include a certain number of seconds of content from before the goal (e.g., to see the play leading up to the goal) and from after the goal (e.g., to see the celebration after the goal). The content from before the goal (which may be generally referred to herein as pre-event content) and the content from after the goal (which may be generally referred to herein as post-event content) may be set by a user, or may be automatically set based on data analyzed over time using machine learning or based on the specific circumstances of the present supercut, or both. Machine learning may allow the supercut generation system to determine future settings or rules based on what the user's preferences were from previous supercuts or clips, what the user's preferences were from previous keywords, parameters, and other inputs, etc. Machine learning may allow the supercut generation system to tailor tags and settings to each individual event. Other settings or parameters may be based on factors not related to the users themselves, including the specific location or region in which the supercut generation system is located, the time of year, time of day, weather, etc. In some embodiments, some settings or rules may be fixed and others may change over time, either dynamically or otherwise. As such, each tag associated with a clip of content may have associated settings or rules. For example, a tag of "hockey" or "goal" may include settings associated with length of clip, pre-event content, post-event content, etc. The length of the clips may also be predetermined (e.g., by the system or by the user's parameters), or can be automatically determined based on the keyword, the content, the user's historical data, etc.

The interface 400 may include other settings, including an "automatic" interface 454 (e.g., interface button), which is configured to cause the supercut generation system to switch from manual mode (where a user may control the settings and/or rules associated with the supercut, to automatic mode, where the supercut generation system generates these settings and/or rules by itself. The interface 400 may also include a "generate" interface 456 to allow the user to initiate the generation of a supercut after the user provides other inputs directed to settings for the supercut. The interface 400 may also include a "devices" interface 458, which may allow a user to switch between certain user devices, such as different DVRs associated with the user. The interface 400 may also include a "rules" interface 460, which may allow a user to input a rule to be associated with a supercut or generation of the supercut, including custom rules. The interface 400 may also include an interface (not shown in FIG. 4) for the user to view clips and manually select which clips should be included in the supercut. The interface 400 may also include interface to allow the user to control viewing of the supercut once the supercut is already being displayed. For example, an interface may be configured to skip the remaining portion of a certain clip and move to the beginning of the next clip in the supercut.

In some embodiments, the supercut 570 generated by the supercut generation system may be generated as a new file, different or separate from the files that included the original content through which the supercut generation system searched for content relevant to the user's requested supercut. In some embodiments, the supercut is not a separate or different file at all such that the clips of content are not copied and/or removed from their original files and placed in a new file. Instead, in some embodiments, the supercut generation system may display the supercut as a compilation of clips displayed in succession. More specifically, the supercut generation system may display each clip one after another, and the supercut generation system may retrieve or stream each clip from its original file, one after another.

Figure 6:
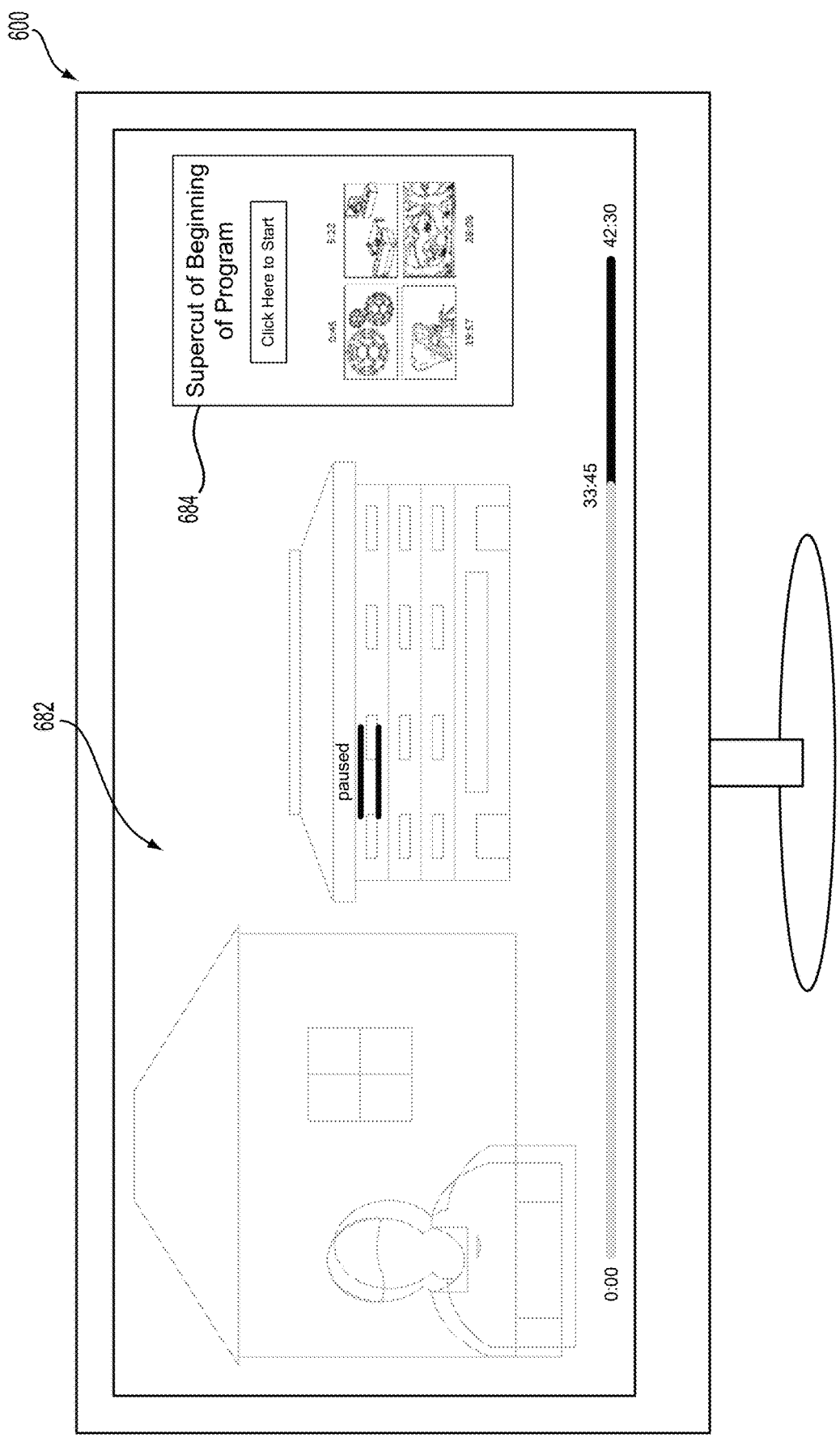
FIG. 6 illustrates a display 600 of an end user device (e.g., television) showing paused programming 682, according to embodiments of the present technology.

FIG. 6 illustrates a display 600 of an end user device (e.g., television) showing paused programming 682, according to embodiments of the present technology. The user device may include a television (e.g., a display and/or a set-top box), a mobile device (e.g., mobile phone, tablet, etc.), computer, or other device configured to view OTA or OTT content. When a user pauses programming on a device, the user may cease watching the programming and return to finish the programming later. In other circumstances, an additional user may watch the rest of the programming or may join the initial user in watching the rest of the programming at a later time. When the initial user returns to finish the programming later, the initial user may fail to remember details regarding the portion of the programming that the user previously watched. If an additional user watches the remaining portion of the programming that the initial user did not watch, the additional user may not have watched the portion previous portion that the initial user did watch. In these situations, a supercut may be used to help a user get caught up on the programming before watching the remaining portion of the programming.

The supercut generation system may generate a supercut 684 based on a portion of the programming already watched by the user. As noted herein, a user or the supercut generation system may narrow the scope of content used when determining which clips should be included in a supercut. Then, the supercut generation system may analyze the relevant or selected scope of content to determine which clips should be included. In some embodiments, the supercut generation system may automatically generate a supercut when a piece of programming is paused by a user. In this case, the scope of content may include only the portion of the piece of programming that the user has already watched (i.e., the portion of the programming from the beginning of the piece of programming to the portion of programming at the time the programming was paused by the user). Such a supercut would then only include clips that would serve to remind the initial user or inform a new user of what occurred in the first portion of the programming.

In some embodiments, the generation of a supercut may be initiated upon the user interacting with the device by pausing the programming content being displayed on the device (or on a display connected to the device). For example, a processor within the device may transmit a communication to the supercut generation system. Receiving this communication may indicate to the supercut generation system that the programming content has been paused by the user, and that the supercut generation system should generate a supercut. The supercut generation system may then determine the scope of the programming content to analyze for clips for the supercut 684, namely the portion of the programming already viewed by the user. The supercut generation system may then analyze the portion of the programming content to determine clips from the portion of programming content to be used in the supercut 684. The supercut generation system may determine which clips should be selected to be included in supercut 684 using one or more of the techniques described herein. For example, the portion of the programming content may be tagged, either as received by the supercut generation system or by the supercut generation system, so that the supercut generation system may search the content of the programming content. The supercut generation system may also use closed captioning, voice, facial, or other recognition software, or other techniques to identify relevant clips from the programming content. For example, if the programming is a sporting event, the supercut generation system may identify clips to include in the supercut based upon when goals or points are scored, and only include clips from each scoring event into the supercut.

The supercut generation system may then generate a new file including each of the individual clips for the supercut, which the user may play instead of the programming content itself. The supercut generation system may also not generate a new file and instead play the clips of the portion of programming content one after another after the clips have been identified (e.g., along with the start and end times of each clip).

When the supercut is complete, or when the supercut generation system has completed generating data (location of clips, start/end times of each clip, etc.) associated with the supercut, the supercut generation system may display a graphic or other interface that may allow the user to select and play the supercut on the display. In some embodiments, the graphic may include images or short clips (e.g., shorter than the actual clips in the supercut itself) of the supercut within the graphic so that the user may see a preview of the supercut it is about to watch. During viewing of the supercut, the supercut generation system may also display a method for the user to return back to and restart the programming content. After the supercut has been displayed in full, the supercut generation system may automatically return to displaying the programming content from the point at which it was paused.

The supercut generation system may also recommend other types of supercuts at different times. For example, the supercut generation system may generate additional supercuts from the initial supercut it generated in response to the user's keyword and request. The additional supercuts may be variations of the initial supercut based on using different preferences, different clips not included in the initial supercut due to length requirements, or other variations. The supercut generation system may automatically present the additional supercuts to the user after the initial supercut is complete, or present an option to the user to play one or more of the additional supercuts at that time. The supercut generation system may also display the additional supercuts while the initial supercut is playing so that the user may switch to one or more of the additional supercuts if the user believes that they would be more interested in the additional supercuts.

The supercut generation system may also determine times at which it may be strategically important to generate and offer access to a supercut based on data it collects from the environment in which the user is present. For example, a sensor connected to the user's device or an auxiliary device may observe the environment and determine when an event occurs that would warrant a supercut offer. For example, the supercut generation system may determine that an additional user has walked into the room, and may then generate and offer a supercut including clips from the first portion of a piece of programming content (e.g., the goal scoring events from the portion of a game already watched by the initial user). The supercut generation system may also use machine learning to identify when specific users enter the environment, and may automatically take an action (e.g., offer a supercut, automatically play a supercut, etc.) based on the individual preferences of the additional user(s). For example, the supercut generation system may identify a user walk into the room who does not typically watch sports, and therefore may not offer a supercut of a portion of the sporting event currently being viewed by the initial user. In another example, the supercut generation system may identify a user walk into the room who typically does watch sports, and therefore may offer a supercut of a portion of the sporting event currently being viewed by the initial user. The supercuts may also be tailored to one or more of the users, such as the specific user who entered the environment. For example, the length of the supercut may be tailored to the new user's preferences, such as preferences set by that user previously or as learned by the supercut generation system based on that user's interactions with the supercut generation system over time.

The supercut generation system may also take other actions other than simply offering supercuts. If the supercut generation system identifies a new user, the supercut generation system may cause the user's device to automatically pause the programming in order to offer a supercut (or other information) to the new user. The supercut generation system may also offer to use picture-in-picture (PiP) to facilitate the new user's education about what was previously viewed by the initial user. Additional possible analyses and offers may be made by the supercut generation system, including only or automatically displaying a supercut during a commercial, timeout, or other break in the programming. For example, the supercut generation system may start displaying the supercut at the beginning of the commercial, and end the supercut when the supercut is complete or when the commercial ends, as set by one of the users or as determined by the supercut generation system using machine learning. In some embodiments, a supercut displayed during a commercial or other break in programming, but not completed during that commercial, may automatically restart during the next commercial or other break in programming.

Figure 7:
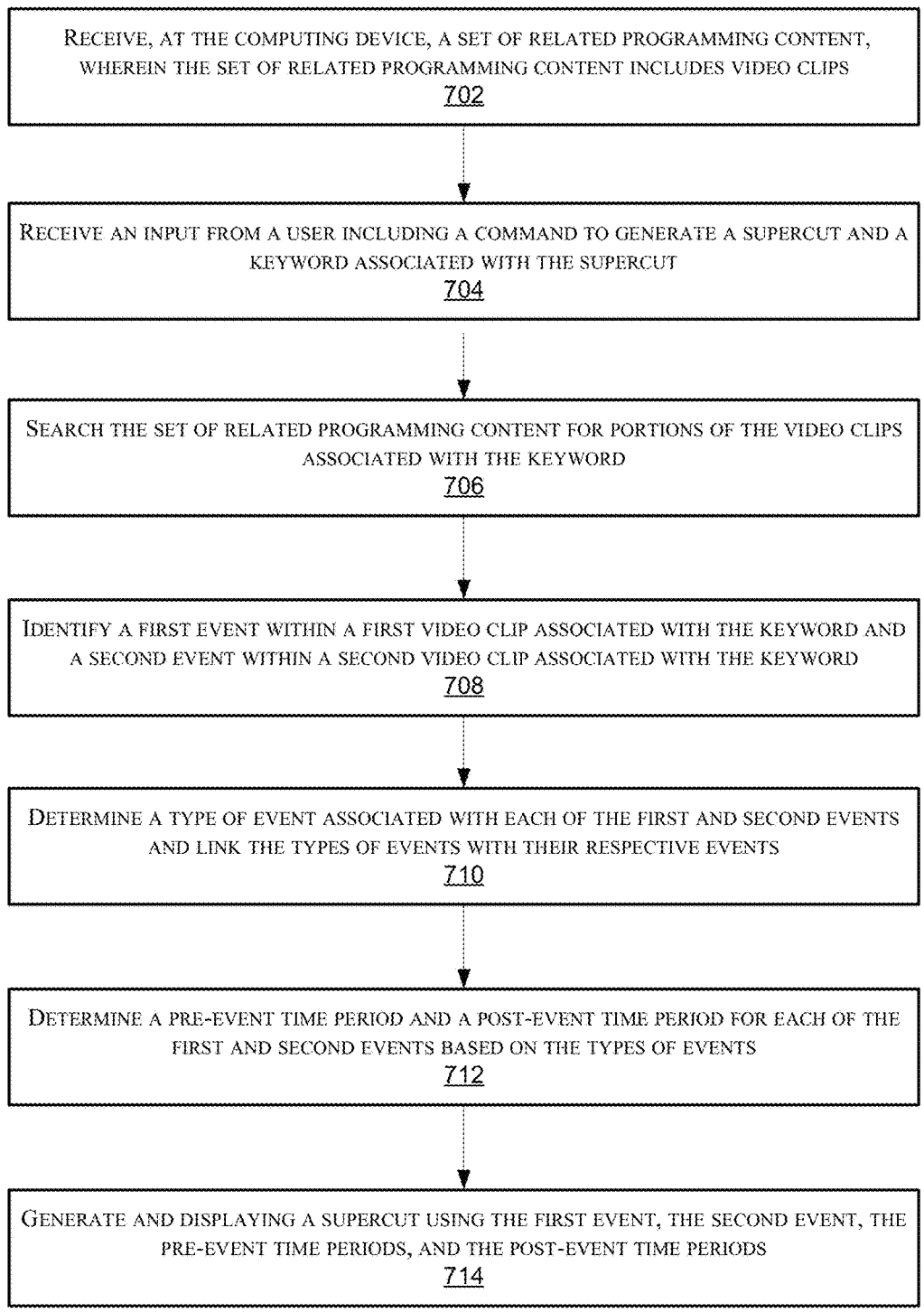
FIG. 7 illustrates a flow diagram including an example process of generating automatic supercuts, according to embodiments of the present technology.

FIG. 7 illustrates a flow diagram including an example process of generating automatic supercuts, according to embodiments of the present technology. Step 702 of the process may include, for example, receiving, at the computing device, a set of related programming content, wherein the set of related programming content includes video clips. Step 704 of the process may include, for example, receiving an input from a user including a command to generate a supercut and a keyword associated with the supercut. Step 706 of the process may include, for example, searching the set of related programming content for portions of the video clips associated with the keyword. Step 708 of the process may include, for example, identifying a first event within a first video clip associated with the keyword and a second event within a second video clip associated with the keyword. Step 710 of the process may include, for example, determining a type of event associated with each of the first and second events and link the types of events with their respective events. Step 712 of the process may include, for example, determining a pre-event time period and a post-event time period for each of the first and second events based on the types of events. Step 714 of the process may include, for example, generating and displaying a supercut using the first event, the second event, the pre-event time periods, and the post-event time periods.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method comprising:
   detecting, responsive to signals received by a computing device, a change in a playback environment in which programming content is presently being displayed to a user via a display device coupled with the computing device;
   determining, automatically in response to the detecting, whether the change in the playback environment is associated with generating a supercut offer;

automatically in response to determining that the change in the playback environment is associated with generating the supercut offer:
- identifying an elapsed portion of the programming content already displayed to the user prior to the detecting;
- identifying a plurality of video clips from the elapsed portion of the programming content as representative of the programming content;
- generating a supercut video comprising playback of the plurality of video clips in a sequence; and
- outputting, to the display device, a graphical indication of the supercut offer to indicate that the supercut video has been generated;

receiving a user interaction with the graphical indication of the supercut offer; and outputting the supercut video for playback by the display device responsive to the user interaction.

2. The method of claim 1, wherein the identifying the plurality of video clips comprises:
- identifying a type of content associated with the programming content;
- searching the elapsed portion of the programming content for a set of events based on the type of content associated with the programming content; and
- identifying the plurality of video clips to include at least some of the set of events.

3. The method of claim 1, wherein the detecting the change in the playback environment comprises receiving signals from a sensor coupled with the computing device, the signals indicating that an additional user has entered the playback environment.

4. The method of claim 3, wherein the determining whether the change in the playback environment is associated with generating the supercut offer is based on individual preferences for the additional user stored by the computing device.

5. The method of claim 3, wherein at least one of identifying the plurality of video clips or generating the supercut is automatically tailored based on individual preferences for the additional user stored by the computing device.

6. The method of claim 1, wherein the detecting is responsive to signals received by a computing device indicating that the user paused the programming content.

7. The method of claim 1, wherein generating the supercut video is automatically tailored based on individual preferences for the user stored by the computing device.

8. The method of claim 1, wherein outputting the supercut video comprises pausing playback of the programming content automatically responsive to the user interaction during playback of the supercut video.

9. The method of claim 1, wherein outputting the supercut video comprises outputting a picture-in-picture display for concurrent playback of the programming content and the supercut video.

10. The method of claim 1, wherein outputting the supercut video comprises:
- determining a temporal location of one or more content breaks in the programming content; and
- directing playback of the supercut video via the display device during the one or more content breaks, and playback of the programming content otherwise.

11. The method of claim 1, wherein:
generating the supercut video comprises generating a plurality of supercut videos, each according to a different respective set of user preferences; and outputting the supercut video comprises outputting a selected first supercut video for playback by the display device responsive to the user interaction.

12. The method of claim 11, wherein outputting the supercut video further comprises, upon completion of playback of the first supercut video, outputting at least a second of the supercut videos for playback by the display device.

13. A computing device, comprising:
one or more processors;
a non-transitory computer readable storage medium communicatively coupled to the one or more processors, having instructions stored thereon, that, when executed by the one or more processors, cause the one or more processors to perform operations including:
- detecting, responsive to signals received by the computing device, a change in a playback environment in which programming content is presently being displayed to a user via a display device coupled with the computing device;
- generating a supercut offer automatically in response to determining that the change in the playback environment is associated with generating a supercut offer by:
  - identifying an elapsed portion of the programming content already displayed to the user prior to the detecting;
  - identifying a plurality of video clips from the elapsed portion of the programming content as representative of the programming content;
  - generating a supercut video comprising playback of the plurality of video clips in a sequence; and
  - outputting, to the display device, a graphical indication of the supercut offer to indicate that the supercut video has been generated;
- receiving a user interaction with the graphical indication of the supercut offer; and
- outputting the supercut video for playback by the display device responsive to the user interaction.

14. The computing device of claim 13, wherein identifying the plurality of video clips comprises:
- identifying a type of content associated with the programming content;
- searching the elapsed portion of the programming content for a set of events based on the type of content associated with the programming content; and
- identifying the plurality of video clips to include at least some of the set of events.

15. The computing device of claim 13, wherein the detecting the change in the playback environment comprises receiving signals from a sensor coupled with the computing device, the signals indicating that an additional user has entered the playback environment.

16. The computing device of claim 15, wherein the determining whether the change in the playback environment is associated with generating the supercut offer is based on individual preferences for the additional user stored by the computing device.

17. The computing device of claim 15, wherein at least one of identifying the plurality of video clips or generating the supercut is automatically tailored based on individual preferences for the additional user stored by the computing device.

18. The computing device of claim 13, wherein outputting the supercut video comprises pausing playback of the programming content automatically responsive to the user interaction during playback of the supercut video.

19. The computing device of claim 13, wherein outputting the supercut video comprises outputting a picture-in-picture display for concurrent playback of the programming content and the supercut video.

20. The computing device of claim 13, wherein outputting the supercut video comprises:
- determining a temporal location of one or more content breaks in the programming content; and
- directing playback of the supercut video via the display device during the one or more content breaks, and playback of the programming content otherwise.

* * * * *